United States Patent [19]

Morinaka et al.

[11] Patent Number: 4,632,206
[45] Date of Patent: Dec. 30, 1986

[54] WATER-COOLED ENGINE COOLER FOR VEHICLE

[75] Inventors: Shigehisa Morinaka, Kawagoe; Katsusuke Komuro, Chofu, both of Japan

[73] Assignee: Honda Giken Kogyo Kabushiki Kaisha, Tokyo, Japan

[21] Appl. No.: 765,982

[22] Filed: Aug. 15, 1985

[30] Foreign Application Priority Data

Aug. 24, 1984 [JP] Japan .................. 59-128428[U]

[51] Int. Cl.$^4$ ............................................. B60K 11/04
[52] U.S. Cl. ..................................... 180/229; 165/41; 180/68.4
[58] Field of Search ............ 180/229, 219, 68.4; 165/41

[56] References Cited

U.S. PATENT DOCUMENTS 4,011,921 3/1977 Sakamoto ......................... 180/229
4,564,081 1/1986 Hamane et al. ..................... 180/229

Primary Examiner—John A. Pekar
Attorney, Agent, or Firm—Armstrong, Nikaido, Marmelstein & Kubovcik

[57] ABSTRACT

A water-cooled engine cooler of the divided type for such vehicles as autobikes, autotricycles, four wheel buggy, etc., is disclosed. The cooler has two radiators for cooling the water-cooled engine, these radiators being inclined with respect to the direction of progress of the vehicle such that their axes extending at right angles to their front intersect with each other at a forward position of the radiator.

4 Claims, 5 Drawing Figures

WATER-COOLED ENGINE COOLER FOR VEHICLE

FIELD OF THE INVENTION AND RELATED ART STATEMENT

This invention relates to a water-cooled engine cooler provided on a vehicle having a saddle-type seat such as an autobike, an autotricycle, four wheel buggy etc.

A water-cooled engine cooler for an autobike, which comprises two radiators disposed on the opposite sides of the vehicle, is disclosed in Japanese Utility Model Publication No. 54,684/1977.

In this water-cooled engine cooler, the two radiators are mounted on opposite side longitudinal pipes of a vehicle frame at a predetermined distance from each other such that they are open forwardly of the water-cooled engine. The front surfaces of the two radiators lie in the same plane.

This water-cooled engine cooler, however, has problems in the radiators cooling efficiency. More specifically, of the air stream that is led to the radiators while the vehicle is running, an air stream portion behind the front wheel is a vortex, so that sufficient cooling air cannot be supplied to the radiators. In addition, air cannot be sufficiently discharged from the radiators due to the presence of the rearwardly located engine and other components. To supply sufficient cooling air and permit sufficient air discharge, the size of the radiators has to be increased.

OBJECT AND SUMMARY OF THE INVENTION

The present invention has been intended in the light of the above, and its object is to provide a water-cooled engine cooler for a vehicle, with which the cooling efficiency is enhanced by permitting sufficient cooling air to be supplied to the radiators and permitting air discharge with an improved efficiency.

According to a first mode of the invention, there is provided a water-cooled engine cooler of divided type for such vehicles as autobikes, autotricycles, four wheel buggy, etc., which comprises two radiators provided on the opposite sides of the vehicle between a front wheel and the water-cooled engine, the two radiators having respective axes extending at right angles to their front and intersecting with each other at a position forwardly thereof. Thus, sufficient cooling air can be supplied to the radiators, and air can be discharged from the radiators smoothly without being obstructed by the rearwardly located water-cooled engine and other components to provide for an improved air discharge efficiency, thus enhancing the cooling efficiency of the radiators. The size of the radiators thus can be readily reduced to permit effective utility of the limited mounting space of a vehicle with a saddle-type seat such as an autobike and reduction of the weight and cost of the vehicle.

According to a second mode of the invention, cooling fans are provided on the back side of the two radiators in the first mode of the invention, thus permitting a further enhanced cooling effect to be obtained.

According to a third mode of the invention, guides extending rearwardly from the radiators in the first mode of the invention are provided so that discharged air having been used for cooling the water-cooled engine can be led toward the sides of the vehicle.

According to a fourth mode of the invention, guides extending rearwardly from the radiators in the second mode of the invention are provided so that discharged air having been used for cooling the water-cooled engine can be led toward the sides of the vehicle.

According to the third and fourth modes of the invention, the air discharge effect is further enhanced.

According to a fifth mode of the invention, dampers are provided on the guides in the third mode of the invention.

According to the sixth mode of the invention, dampers are provided on the guides in the fourth mode of the invention.

According to the fifth and sixth modes of the invention, the dampers may be opened to lead a portion of the discharged air having been used for cooling the water-cooled engine to the rider's legs to heat the feet of the rider during running under a cold weather condition.

BRIEF DESCRIPTION OF THE DRAWINGS

FIGS. 1 to 3 illustrate one embodiment of the invention, in which:

FIG. 1 is a side view showing an autobike with a cool water engine cooler of divided type;

FIG. 2 is a front view, partly broken away, showing the same autobike; and

FIG. 3 is a plan view, showing an essential part of the same autobike; and

FIGS. 4 and 5 illustrate a different embodiment of the invention, in which:

FIG. 4 is a plan view showing an essential part of the embodiment; and

FIG. 5 is a view taken along line 100—100 in FIG. 4.

DETAILED DESCRIPTION OF THE PREFERRED EMBODIMENTS

Figure 1:
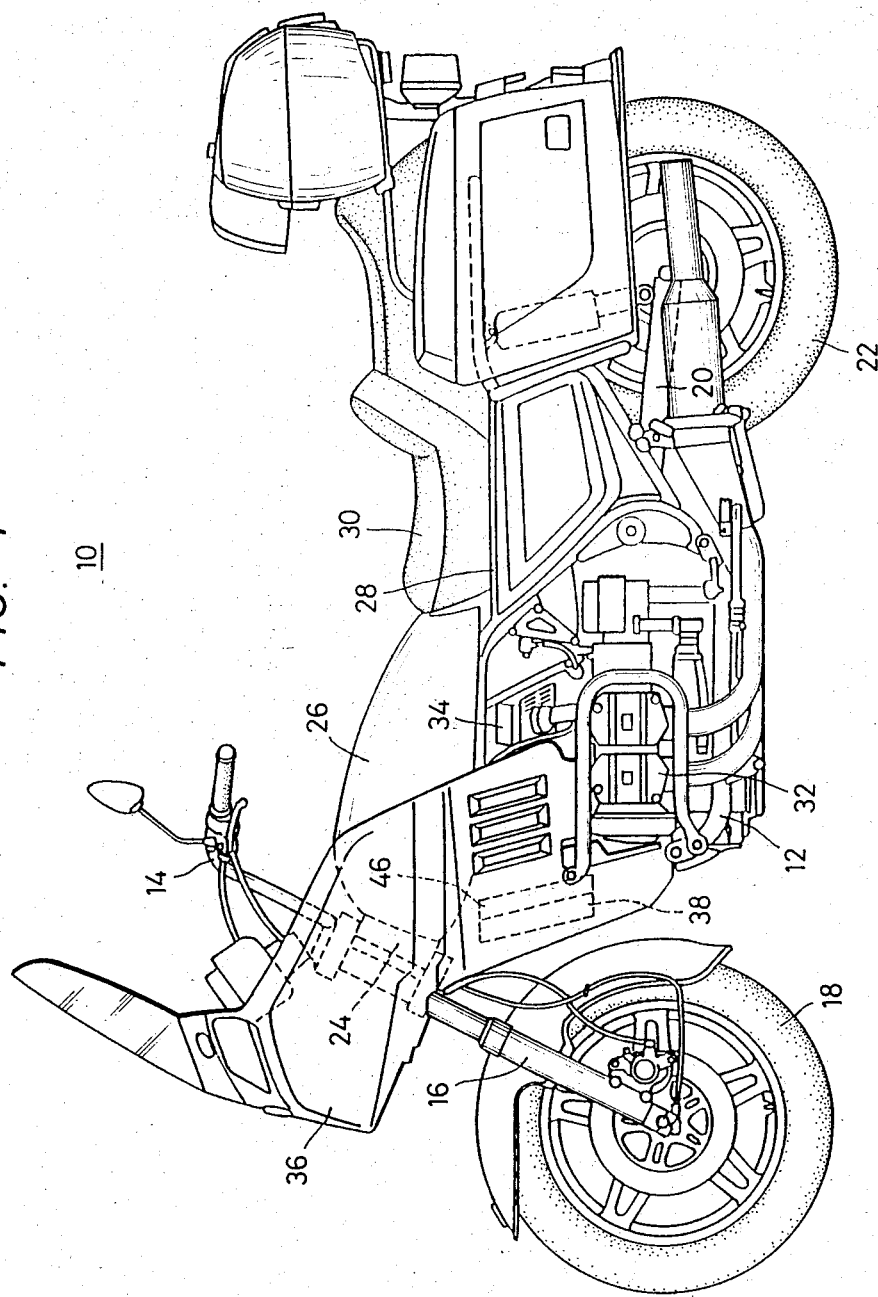
Figure 2:
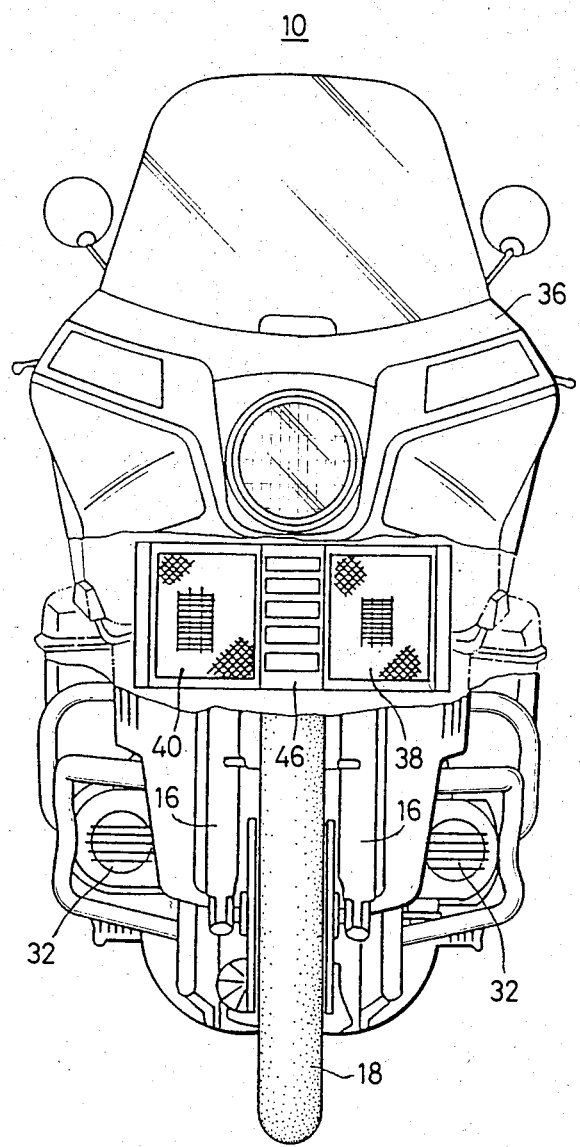
Figure 3:
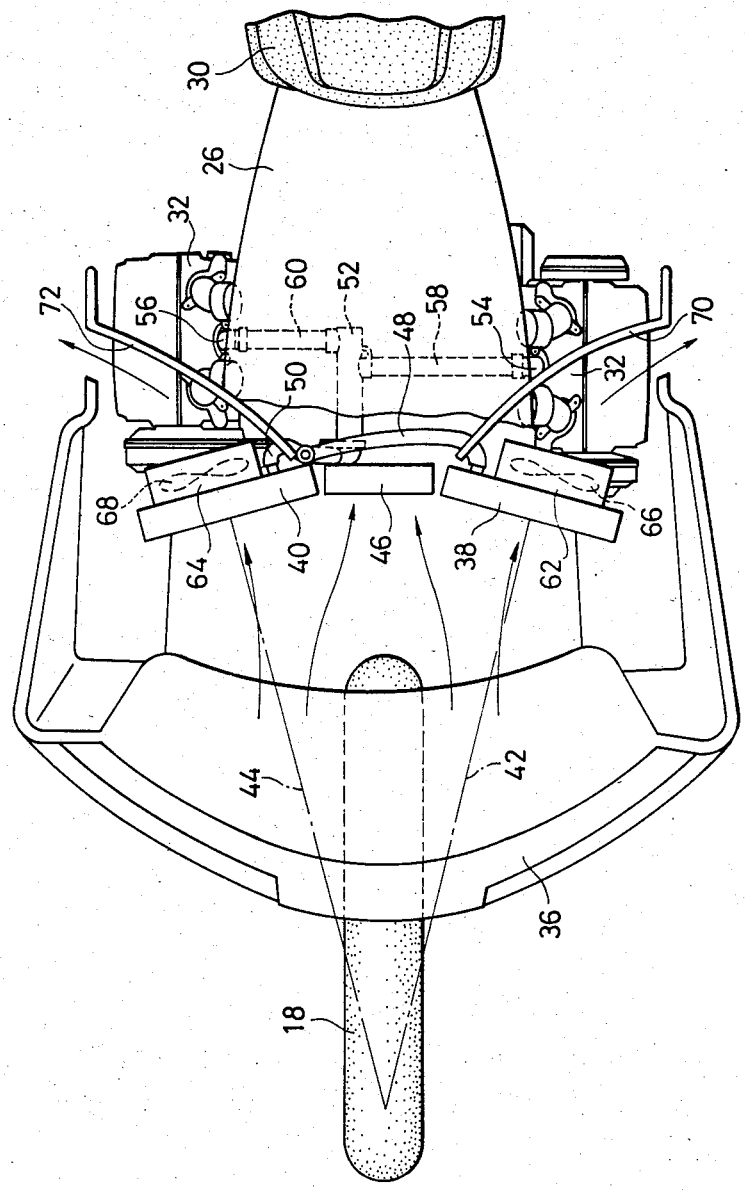

Now, an embodiment of the invention applied to an autobike will be described with reference to FIGS. 1 to 3.

An autobike 10, on which the engine cooler according to the invention is mounted, has a front wheel 18 mounted in a pair of front forks 16 provided on a front portion of a frame 12 and stearable by a handle 14 and a rear wheel 22 mounted in a pair of swing arms 20 pivoted to and rearwardly extending from a rear lower portion of the frame 12. A fuel tank 26 is provided on top of a main frame (not shown) rearwardly extending from a head pipe 24 of the frame 12. A seat 30 is provided over a pair of seat pipes 28 extending from the rear end of the fuel tank 26. A horizontal opposing type four-cylinder water-cooled engine 32 and a carburetor 34 are provided beneath the fuel tank 26. A rear portion of the front wheel 18 and a front portion of the water-cooled engine 32 are covered by a front hood fairing 36, which extends forwardly of the handle 14 and has a front opening, through which air can be introduced.

The divided type engine cooler for the water-cooled engine 32, consists of a left radiator 38 and a right radiator 40, these radiators being provided on the left and right sides, respectively, between the front wheel 18 and water-cooled engine 32. As shown in FIG. 3, the two radiators 38 and 40 are mounted on vertical pipes (not shown) of the frame 12 such that their respective axes at right angles to their front intersect at a position forwardly of them. The divided type engine cooler also has an air duct unit 46 which is provided between the left and right side radiators 38 and 40. It is to be noted that the radiators 38 and 40 are inclined such that their outer ends are nearer the front. An end of radiator hose 48 is connected to the back of the left side radiator 38, while an end of a radiator hose 50 is connected to the back of the right side radiator 40. The other ends of the radiator hoses 48 and 50 are connected to a water pipe 52. To the water pipe are connected water pipes 58 and 60 which have one of their ends connected to respective connection ports 54 and 56 of the water-cooled engine 32. Cooling water which has been forced out from a water pump (not shown) and elevated in temperature after cooling the water-cooled engine 32, is supplied through the water pipes 58 and 60, water pipe 52 and radiator hoses 48 and 50 to the radiators 38 and 40. The water supplied to the radiators 38 and 40 are subjected to heat exchange to be cooled down before being recirculated from power outlet portion of the radiators 38 and 40 through separate radiator hoses (not shown) to the water pump. The water-cooled engine 32 is cooled by the recirculated cool water.

Fan cases 62 and 64 accommodating respective fans 66 and 68 are mounted on the rear, air discharge side of the radiators 38 and 40. Guides 70 and 72 are provided such that they extend rearwardly from the fan cases 62 and 64 for leading air discharged from the radiators 38 and 40 obliquely rearwardly. Discharge air having undergone the heat exchange, can be forcibly discharged obliquely rearwardly from the left and right rear ends of the front hood 36.

The air duct unit 46 that is provided between the two radiators 38 and 40 can be opened and closed either automatically or manually. When the air duct unit 46 is opened, air is taken in through a plurality of holes or apertures formed at the front to be forced to the rearwardly located water-cooled engine 32 and carburetor 34 for cooling the same. Air forced out from the air duct unit 46 is not mixed with the discharged air from the radiators 38 and 40 by virture of the presence of the guides 70 and 72. Thus, it is possible to obrtain improvement of the efficiency of cooling the water-cooled engine 32. The air duct unit 46 provided between the two radiators 38 and 40 may be made integral therewith or provided separately therefrom.

Figure 4:
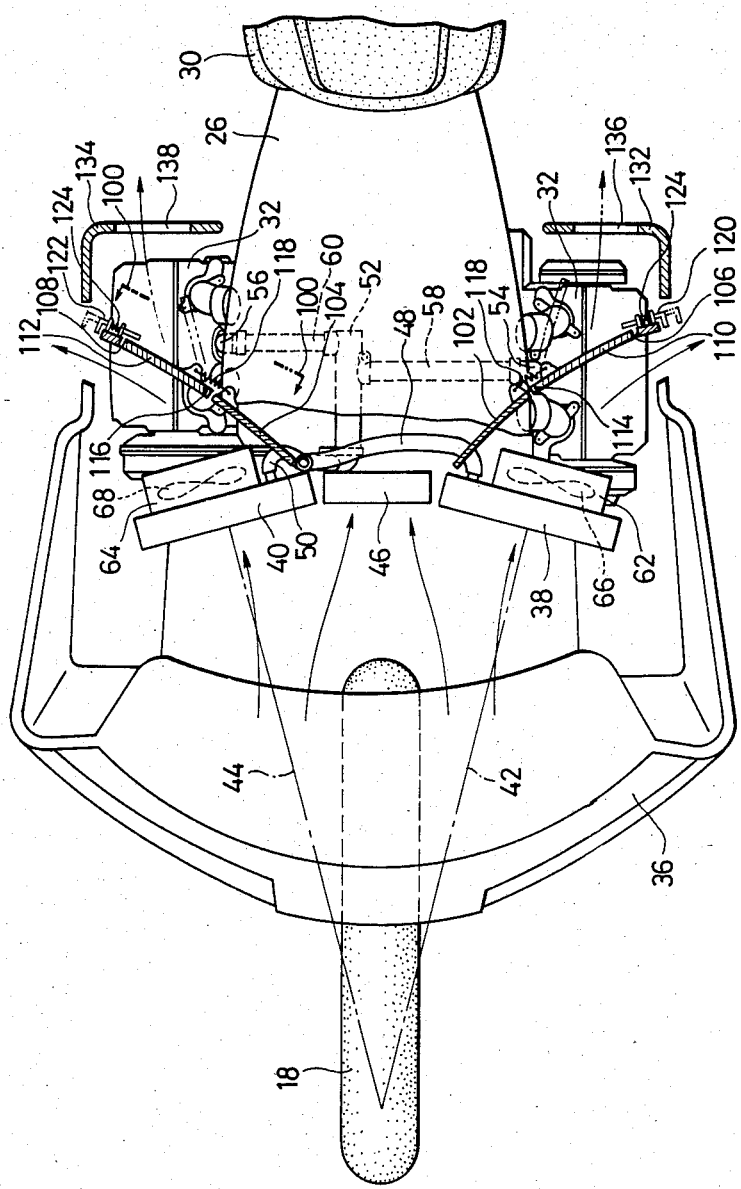
Figure 5:
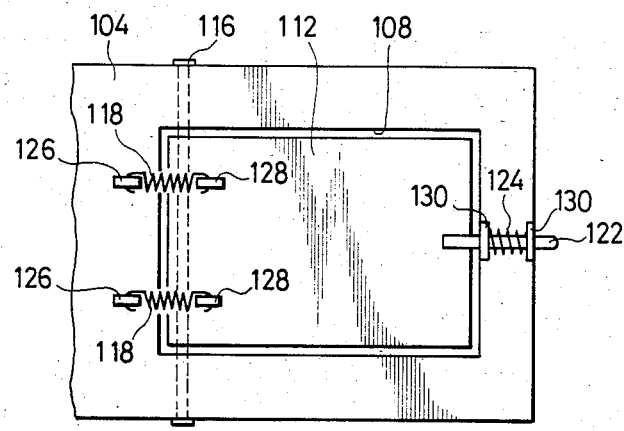

FIGS. 4 and 5 illustrate a different embodiment of the invention. In this embodiment, guides with openings are provided, and these openings are opened and closed by dampers provided rearwardly of the guides. When running the autobike under a cold weather condition, the openings may be opened by the dampers to lead discharged air having cooled the water-cooled engine to the legs of the rider, thus providing a heating effect on the rider. In FIGS. 4 and 5 parts having the same function as those in FIGS. 1 to 3 are designated by like reference numerals, and their description is omitted.

Like the preceding embodiment, guides 102 and 104 extend rearwardly from fan cases 62 and 64 for leading discharged air from radiators 38 and 40 obliquely rearwardly. Discharged air having undergone the heat exchange thus can be forcibly led obliquely rearwardly from the opposite side rear ends of hood 36.

The guides 102 and 104 have respective openings 106 and 108 provided at positions forwardly of the rider's legs. Dampers 110 and 112 are pivoted by pins 114 and 116 to the guides 102 and 104 for opening and closing the openings 106 and 108. A pair of coil springs 118 are stretched between the back side of the respective guides 102 and 104 and the back of portions of the respective dampers 110 and 112 where the pins 114 and 116 are inserted. On the back side of the outer end of the guides 102 and 104, respective lock pins 120 and 122 are spring biased by springs 124 to be in forced contact with the back side of the front end of the dampers 110 and 112.

FIG. 5 shows the relation between the guide 104 and damper 112 in detail. The damper 112 is pivotally coupled by the pin 116 to the guide 104 such that it can close the opening 108 of the guide 104. The back side of the guide 104 is provided with brackets 126, and the back side of a stem portion of the damper 112 is provided with brackets 128. A pair of springs 118 are stretched between the respective brackets 126 and 128 so that the damper 112 can be pivotally moved rearwardly to open the opening 108. The back side of the outer end of the guide 104 is provided with brackets 130. A lock pin 122 penetrates the brackets 130, and it is spring biased by a spring 124 such that its end portion extends on the back side of the end of the damper 112. The damper 112 is usually closing the opening 108 so that discharge air is led obliquely rearwardly. When the lock pin 122 is disengaged from the damper 112 by pulling it, the damper 112 is pivotally moved by the biasing force of the coil spirngs 128 up to a position shown by the phantom line in FIG. 4, thus opening the opening 108. The relation between the guide 102 and damper 110 is the same as the relation between the guide 104 and damper 112 as described above.

Leg guards 132 and 134 are provided rearwardly of the water-cooled engine 32. These leg guards 132 and 134 have respective projections 136 and 138 extending forwardly of the rider's legs.

Thus, when the air duct unit 46 is closed and the openings 106 and 108 of the guides 102 and 104 are opened by bringing the dampers 110 and 112 to the open position, discharge air having become warm after cooling the water-cooled engine 32 is discharged rearwardly through the openings 106 and 108 to flow through the projections 136 and 138 of the leg guards 132 and 134 toward the rider's legs, thus heating the rider.

We claim:

1. A water-cooled engine cooler of the divided type for a vehicle having a saddle-type seat, comprising two radiators provided on the opposite sides the centerline of a vehicle between a front wheel and a water-cooled engine, said two radiators having respective axes extending at right angles to their front surfaces, which axes intersect at a position forward of the radiators, and a pair of guides, each of which is disposed rearwardly of one of said radiators and projecting outwardly obliquely to the centerline of the vehicle for leading air discharged through said radiators toward the sides of the vehicle.

2. The water-cooled engine cooler according to claim 1, wherein cooling fans are provided on the rear side of said respective radiators.

3. The water-cooled engine cooler according to claim 2, wherein said guides have respective openings, and dampers for opening and closing said openings are provided on said guides such that they can be opened rearwardly of the vehicle.

4. The water-cooled engine cooler according to claim 1, wherein said guides have respective openings, and dampers for opening and closing said openings are provided on said guides such that they can be opened rearwardly of the vehicle.

* * * * *